Feb. 23, 1926.  
J. M. SMITH  
1,574,130  
MANIFOLD AND METHOD OF SUPPLYING EXPLOSIVE MIXTURES TO INTERNAL EXPLOSION ENGINES  
Filed August 20, 1923
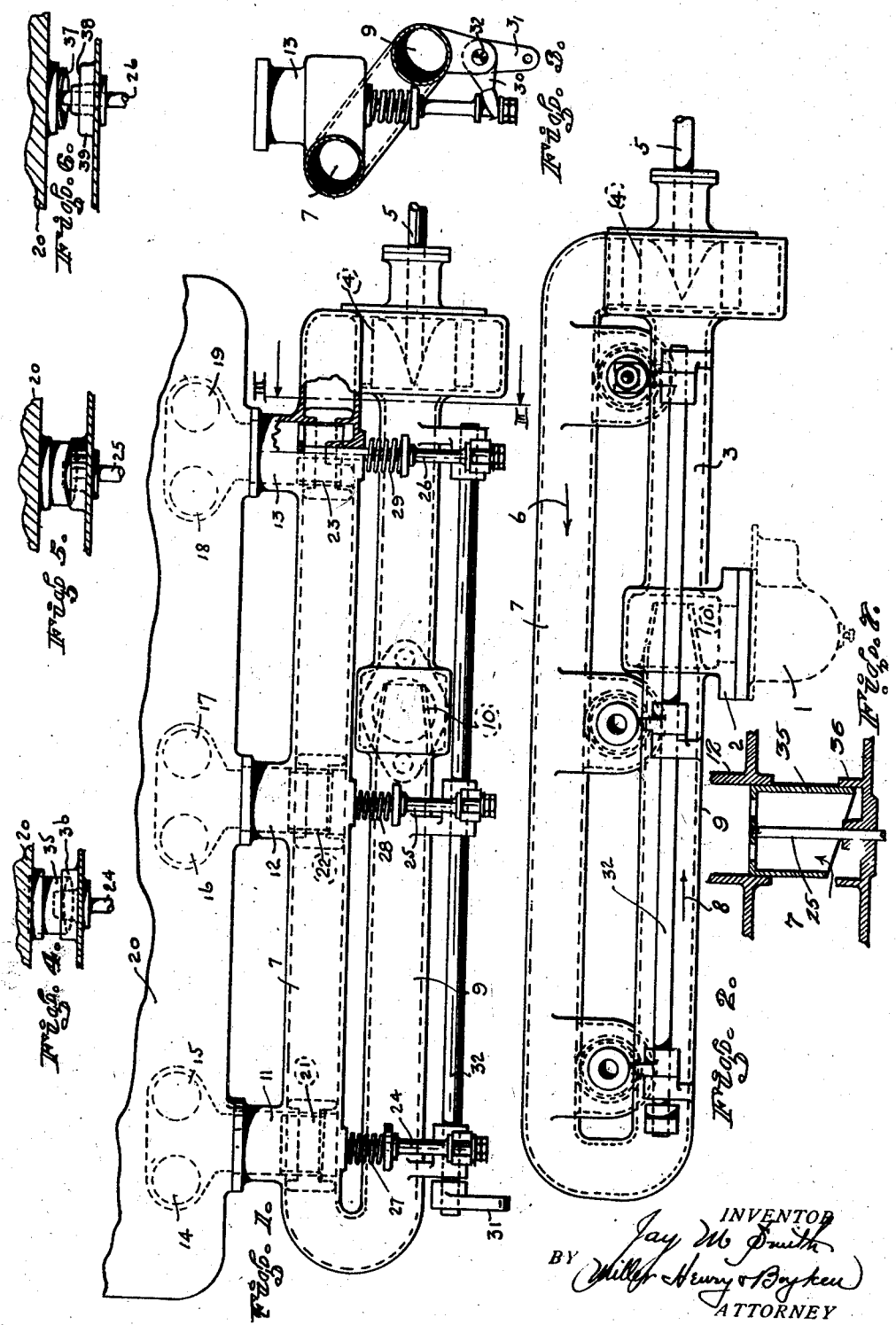
INVENTOR  
Jay M. Smith  
BY Miller, Henry & Boykin  
ATTORNEY Patented Feb. 23, 1926.

1,574,130

UNITED STATES PATENT OFFICE.

JAY M. SMITH, OF SAN FRANCISCO, CALIFORNIA.

MANIFOLD AND METHOD OF SUPPLYING EXPLOSIVE MIXTURES TO INTERNAL-EXPLOSION ENGINES.

Application filed August 20, 1923. Serial No. 658,211.

*To all whom it may concern:*

Be it known that I, JAY M. SMITH, a citizen of the United States, and a resident of the city and county of San Francisco, State of California, have invented new and useful Improvements in Manifolds and Methods of Supplying Explosive Mixtures to Internal-Explosion Engines, of which the following is a specification.

My invention has for its object the maintenance of a high velocity of the explosive mixture formed by gasoline or other hydrocarbon oil after it is mixed with air as in a conventional carburetor, the said high velocity being maintained regardless of the demands of the engine; and thereby maintaining a perfect explosive mixture free from condensation, in proximity to the inlet valves of the engine and if desired in sufficient volume at all times to meet the maximum engine demand.

A further object is a throttle valve located between my circulating manifold and the cylinders of the engine, the said throttle valve being for the purpose of controlling the flow of mixture from the manifold to the engine.

A further object is the employment of a carburetor in combination with my manifold without a throttle valve there between, the throttle valve or valves above specified being substituted for the conventional throttle valve of the carburetor.

A further object is the employment of throttle valves having an annular throttling edge, angular to the valve seat.

A further object is a plurality of throttle valves between the outlet of the manifold and the engine cylinders.

A further object is the supplying of explosive mixture to internal combustion engines from a reservoir or manifold in which the mixture is maintained at a high velocity irrespective to the motor speed.

Other objects will appear from the drawings and specifications which follow.

Referring to the drawing:

Figure 1 is a plan view of apparatus employing my invention attached to the conventional internal explosive engine block.

Figure 2 is a side view of the manifold and other parts of Figure 1.

Figure 3 is a cross section of Figure 1 on the line III—III.

Figure 4 is a fragmentary showing of one of the throttle valves in closed position.

Figure 5 is the same as Figure 4, except that the valve is partly open.

Figure 6 is the same as Figure 4, except that the valve is wide open.

Figure 7, is a central right angular cross sectional view of the valve shown in Figure 5, except that the valve stem is shown in plan.

Throughout the figures similar numerals refer to identical parts.

A conventional carburetor is shown by the numeral 1 mounted to deliver explosive mixture to the inlet 2 of my manifold. From the carburetor the mixture flows through the manifold passage 3, being drawn there through by the impeller 4 driven from the shaft 5 from any suitable power source as the main shaft of the engine well known but not shown. From the impeller the mixture follows in the direction of the arrow 6, through the manifold member 7 and thence in the direction of the arrow 8 through the return member 9 and through the injector nozzle 10 to insure a static pressure in chamber 7.

It will now be seen that the mixture in the manifold members 3, 7 and 9 follows the course of the arrows 6 and 8 at a high velocity due to the action of the impeller 4 and nozzle 10, thus maintaining a perfect vaporized mixture avoiding condensation or precipitation of the liquid fuel.

Opening from the manifold 7 and the valve chambers 11, 12, 13 adapted to supply the inlet valves 14, 15 and 16, 17 and 18, 19 of the engine; a portion of the engine block only is shown at 20. In the valve chambers 11, 12, 13, are throttle valves 21, 22, 23 respectively carried upon suitable stems 24, 25 and 26 and normally maintained in closed position by well known springs 27, 28, 29 respectively. The throttle valves are actuated by the connections 30, 31, 32, under the control of the operator as through the conventional pedal or steering wheel connections.

Upon the rotation of the impeller 4 from the driving shaft 5 the explosive mixture contained therein is circulated at a high velocity, as indicated by the arrows 6, 8.

Upon opening the throttle valves the suction of the engine through the valves 14 to 19 supplies a perfect explosive mixture in accordance with the engine requirements.

On the closing of these throttles the high velocity of explosive mixture is at all times maintained in the manifold.

The form of the valve which I prefer to employ is best shown in Figures 4 to 6, the valves being of cylindrical form, as shown at 35, telescoping within the valve seat 36 and having an edge angular with respect to said seat, whereby the opening is in the form of a crescent, thus enabling the operator to maintain a fine adjustment during idling or slow driving periods, by adjustably restricting with great nicety the volume of explosive mixture abstracted from the passage 7. The angular shape of the annular valve edge at 37 in combination with the edge of its seat member 39 is best shown at 38, Figure 6.

I claim:

1. In combination with an internal explosion engine an inlet manifold having a return passage adapted to continuously circulate explosive mixture and inlet and outlet connections to said passage an impeller interposed into said passage to force the circulation of said mixture independent of the engine demands, inlet and outlet connections to said manifold and throttling means interposed in said outlet and operating connections for said throttling means and a constricted throat located within said passage adapted to deliver circulating mixture at increased velocity adjacent the said inlet.

2. In combination with an internal explosion engine an inlet manifold having in combination therewith a return passage adapted to continuously circulate explosive mixture, an impeller interposed in said passage to force said circulation independent of the engine demands, an inlet in the return passage for explosive mixture, a plurality of outlets from said manifold adapted to convey explosive mixture to said engine, throttling means interposed in each of said outlets, operating connections for said throttling means and a device in the path of said circulating mixture constructed and adapted to discharge said mixture at an increased velocity.

3. In combination with an internal explosion engine an inlet manifold having in combination therewith a return passage adapted to continuously circulate explosive mixture, an impeller interposed in said passage to force said circulation independent of the engine demands, an inlet in the return passage for explosive mixture, a plurality of outlets from said manifold adapted to convey explosive mixture to said engine, throttling means interposed in each of said outlets, operating connections for said throttling means and a throat piece within the path of said circulating mixture adapted to discharge the said mixture at increased velocity.

JAY M. SMITH.